United States Patent [15] 3,681,519
Larsen et al. [45] Aug. 1, 1972

[54] SINGLE-TUBE COLOR CAMERAS WITH OPTICAL SPATIAL FREQUENCY FILTERS

[72] Inventors: Arthur Bertel Larsen; Thomas Patrick Sosnowski, both of Colts Neck; Richard Lee Townsend, Jr., Berkeley Heights, all of N.J.

[73] Assignee: Bell Telephone Laboratories, Incorporated, Murray Hill, Berkeley Heights, N.J.

[22] Filed: Dec. 21, 1970

[21] Appl. No.: 100,163

[52] U.S. Cl. ..........................178/5.4 ST, 350/162 SF
[51] Int. Cl. ..........................H04n 9/06
[58] Field of Search ............178/5.4 R, 5.4 ST, 5.4 E; 350/162 SF

[56] References Cited

UNITED STATES PATENTS 3,566,013 2/1971 Macovski.................178/5.4 ST
2,705,258 3/1955 Lesti.........................178/5.4 ST
2,733,291 1/1956 Kell..........................178/5.4 ST
3,588,224 6/1971 Pritchard..................178/5.4 ST

*Primary Examiner*—Robert L. Richardson
*Attorney*—R. J. Guenther and E. W. Adams, Jr.

[57] ABSTRACT

In a Kell-type single-tube color camera system, an optical spatial frequency filter in the form of an asymmetrical rectangular wave phase-only diffraction grating is disposed between the object scene and the striped color filters. The optical filter is designed to provide an optical transfer function that has a region of high attenuation which extends from the lower limit of the carrier frequency passband, produced by the modulation of the imaged input scene by the striped color filters, to at least the upper limit of said passband.

5 Claims, 6 Drawing Figures

INVENTORS A. B. LARSEN
T. P. SOSNOWSKI
R. L. TOWNSEND
BY John K. Mullarney
ATTORNEY

SINGLE-TUBE COLOR CAMERAS WITH OPTICAL SPATIAL FREQUENCY FILTERS

BACKGROUND OF THE INVENTION

This invention relates to television camera systems and, more particularly, to single-tube color cameras having optical filters for achieving predetermined optical transfer functions.

As is well known, transmission of a color representation of a scene requires three independent video signals. These signals must be registered to produce an acceptable reconstruction of the original scene and single-tube cameras, such as are disclosed in U. S. Pat. No. 2,733,291, issued Jan. 31, 1956 to R. D. Kell, have been used to assure registration. The Kell-type camera employs striped color filters or gratings vertically positioned to spatially modulate two primary color images (such as red and blue) onto the target surface. As used therein, an image is spatially modulated when it is filtered to form a striped pattern and the frequency of spatial modulation is determined by the filter's line density or spatial frequency which is proportional to the number of stripes per unit length orthogonal to the stripes. Conventionally, the target on which the spatially modulated images are formed is scanned to generate, as part of a complex electrical output, two electrically modulated signals, each having a different carrier frequency. The third independent image is not spatially modulated and forms part of a baseband signal. This Kell system is, unfortunately, not satisfactory for use in certain television applications, such as the PICTUREPHONE visual telephone, primarily because it requires a wide band to accommodate the three frequency multiplexed portions of the output.

In the copending patent application of A. B. Larsen, Ser. No. 7501, filed Feb. 2, 1970, an improved Kell-type single-tube color camera system is disclosed which utilizes striped color filters to spatially modulate two primary color images (e.g., red and blue) onto carriers at the same frequency. Each image is modulated by a filter of a different color, both of which have the same spatial frequency, but are tilted relative to the scanning direction by equal angles in opposite senses. Parameters are chosen to produce interleaving energy distributions for the two signals at a common carrier frequency so that they may subsequently be separated by comb filters. Because the aforementioned two signals occupy the same frequency band, a considerable savings in bandwidth is realized.

Problems are encountered, with Kell-type single-tube color cameras, when the object scene has horizontal spatial frequencies that correspond to the horizontal spatial frequency of the color gratings. These frequencies can arise either from various striped patterns in the object scene (e.g., striped shirts), or from edges since the Fourier decomposition of an edge has frequencies in the appropriate range. The effects observed are twofold. Because the decoding scheme erroneously interprets these higher spatial frequencies as color information, incorrect colors will be observed in those portions of the object scene. Perhaps more importantly, strong moire patterns are also observed. These moire patterns move annoyingly as the object in the scene moves. The source of these moire patterns is considered as being due to the interaction of the Kell-type color gratings with the gratings produced by the appropriate range of spatial frequencies in the scene. These problems are of such severity that, absent some solution, the practicability of single-tube color camera encoding is debatable.

SUMMARY OF THE INVENTION

It is accordingly the primary object of the present invention to overcome the aforementioned problems.

It is a further object of the invention to provide a lossless optical spatial frequency filter for achieving a selected optical transfer function.

A related object is to provide an optical spatial filter of the desired characteristics that can be simply and economically produced.

The solutions to the problems of color misinformation and the generation of moire patterns have been found to be the same. Simply stated, those frequencies that result in the aforementioned problems must be filtered out. Since the interactions which produce these problems are optical in nature, they obviously occur before the scene is translated into an electrical signal. Once this translation is made, the original scene cannot be recovered. Thus, the filtering must be accomplished optically before the image reaches the camera tube target surface. Moreover, this filtering must be efficient, not only in terms of elimination of the troublesome frequencies, but also in terms of maintaining good resolution and minimum loss of incident light.

In accordance with the invention, an optical spatial frequency filter in the form of a phase-only diffraction grating is disposed between the object scene and the Kell-type color filters of a single-tube color camera. The diffraction at the grating deflects the light in much the same fashion as the conventional Fraunhofer diffraction grating, but since it is a phase-only grating it is essentially lossless in terms of incident light energy. By appropriate choice of the spatial frequency and waveform of the spatial phase variations of the grating a preferred optical transfer function can be achieved. More specifically, an optical transfer function can be arrived at that has a region of high attenuation which extends from the lower limit of the carrier frequency passband, produced by the modulation of the imaged input scene by the Kell-type color filters, to at least the upper limit of said passband. Thus, those spatial frequencies in the object scene which might produce electrical signals in the aforementioned passband are effectively filtered out and the problems of color misinformation and moire patterns are thereby eliminated.

In accordance with a feature of the invention the optical filter comprises an asymmetrical rectangular wave phase grating that can be simply and economically produced from dichromated gelatin.

DETAILED DESCRIPTION

Figure 1:
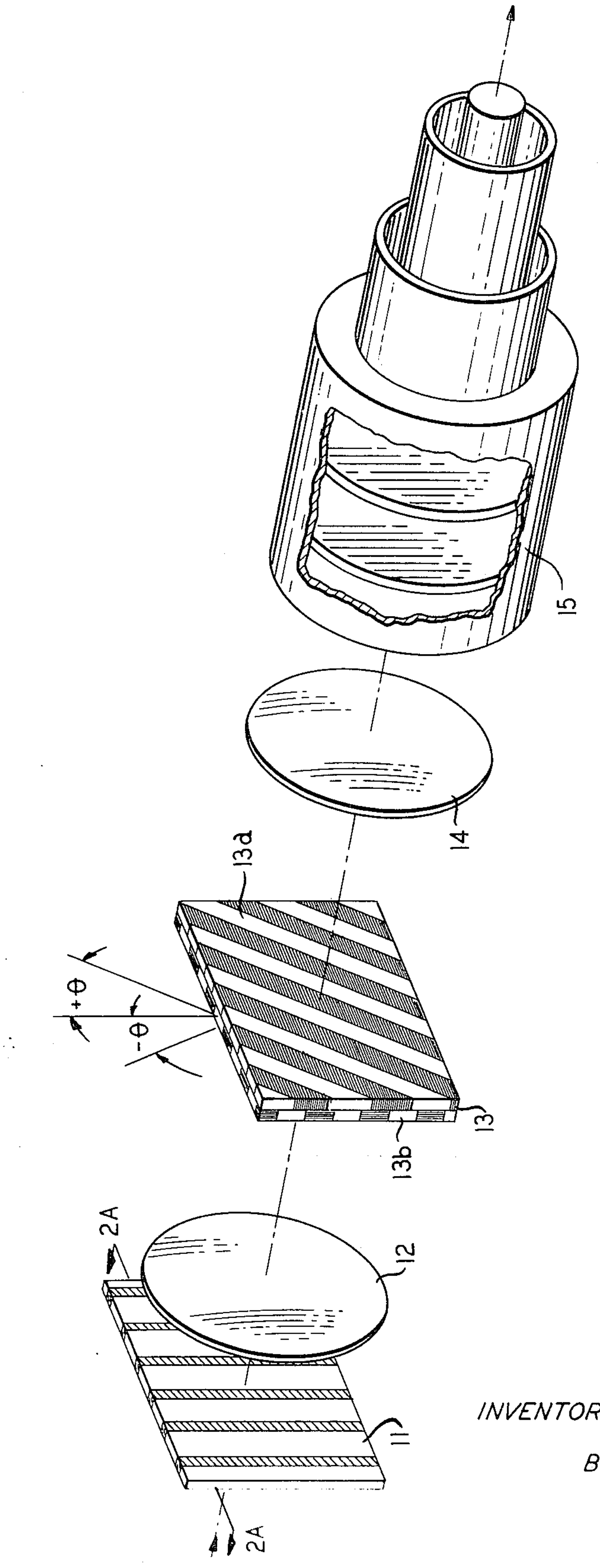
FIG. 1 is a simplified, exploded, perspective view of a Kell-type single-tube color camera system including an optical filter in accordance with the invention.

Turning now to FIG. 1 of the drawings, the light from an object scene passes through the optical filter 11, to be described in detail hereinafter, to the object lens system, illustrated by lens 12, and forms an image on the light modulator 13. The relay lens 14, in turn, focuses the modulated images onto a suitable single aperture, image scanning device 15, which serves to generate electrical signals having characteristics that vary in a given manner in accordance with the variations in the intensity of light along the path scanned by the aperture. The image scanning device 15 may, for example, comprise an image orthicon pick-up tube having a photoelectric surface onto which object images are focused by relay lens 14.

For purposes of explanation, the light modulator 13 shall be assumed to be of the type disclosed in the aforementioned Larsen application. As described in greater detail in this Larsen application, gratings or striped filters 13a and 13b, similar to those of the Kell patent, supra, are placed in the light path between the scene and the camera's target and are responsible for the generation of selected high frequency energy distributions as the beam scans the filtered images. The grating patterns 13a and 13b each comprise parallel uniformly spaced regions of material providing low transmission of a specific region of the color spectrum; the spaces between the regions transmit all light. Successive regions and spaces of each grating constitute pairs of stripes which alternately transmit substantially all light and substantially block a single primary color. Both gratings have identical densities or number of pairs of stripes per unit length orthogonal to the stripes. One filter or grating **13*a* may provide a repetitive alternating pattern of totally transmitting stripes and nonred-transmitting (opaque-to-red light) stripes. The other filter or grating 13*b* provides a repetitive alternating pattern of total transmission and opaque-to-blue stripes. The gratings 13*a* and 13*b* are conventional striped color filters of the dichroic or absorption type and they selectively pass and block light from a scene to the target and thereby provide spatial modulation of red and blue images, respectively seen as striped patterns on the camera tube target. Light other than the primary colors blocked by the stripes of gratings 13*a* and 13*b* passes unaffected to the target. This light containing the green primary image combined with portions of the other color images that have been transmitted by the gratings 13*a* and 13*b*, result in the baseband portion 31 of the output spectrum shown in FIG. 5. The spectrum also includes a modulated band 32 which contains for each modulated grating a carrier 33 and upper and lower sidebands distributed at distinct discrete frequencies. The two modulated signals are of essentially the same carrier frequency since the gratings 13*a* and 13*b* have identical densities and are tilted, from the vertical, at a counterclockwise angle ($-\theta$) and a clockwise angle ($+\theta$), respectively. This results in the two modulated images having substantially the same periodicity of transmitted and blocked light along any scan line. The relative tilting of the two modulating gratings 13*a* and 13*b* causes the red and blue signals to undergo equal but opposite phase shifts from one line to the next, and it is this shift in phase which provides interleaving and ultimately allows separation of the two signals. So much for the light modulator 13**.

While a particular form of light modulator has been described, it is to be understood that the principles of the present invention are in no way limited thereto and are equally applicable to other single-tube color camera arrangements that utilize other forms of light modulators. For example, an optical spatial filter in accordance with the present invention can be advantageously utilized in the single-tube color camera system disclosed in the copending application of S. Y. Chai, Ser. No. 7500, filed Feb. 2, 1970, or even in the basic single-tube color camera system of the Kell patent, cited above.

While the light modulator 13 is shown in FIG. 1 as a separate and distinct element of the color camera assembly, in practice the two sets of absorptive color stripes that comprise the modulator will typically be deposited on the face of the camera tube.

Figure 2A:
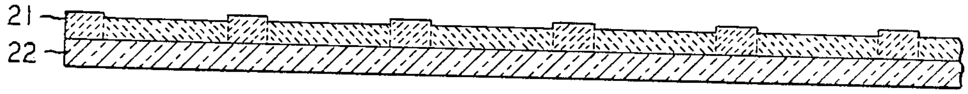
FIG. 2A is an enlarged sectional view of the optical filter taken on the line 2A—2A of FIG. 1.
Figure 2B:
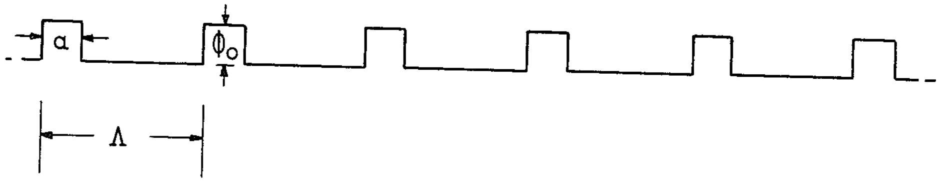
FIG. 2B is a diagram of the grating phase of the optical filter illustrated in FIG. 2A.

Now in accordance with the invention, the optical filter 11 preferably comprises a rectangular wave phase grating. Since the raster scan lines are typically horizontal, only the horizontal components of the spatial frequencies need be filtered. Thus, the filter 11 is uniform in the vertical direction. Horizontally, the filter has alternate stripes, having a relative phase difference $\phi$, as illustrated by FIGS. 2A and 2B. The amplitude transmittance of the filter is:

$$T(x, y) = e^{(j\phi(x))} \tag{1}$$

where $\phi(x)$ is the phase of the rectangular wave phase grating, as depicted in FIG. 2B.

Figure 3:
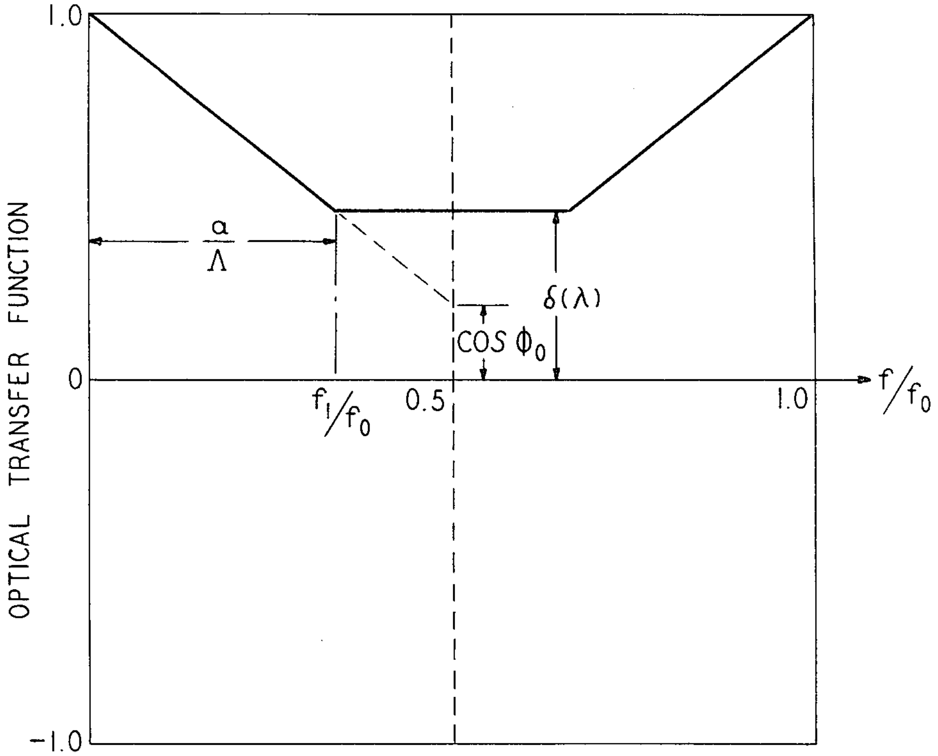

The parameters of interest of the phase grating are the grating period ($\Lambda$), the grating duty cycle ($a/\Lambda$), and the relative phase retardation ($\phi_o$) between alternate stripes. The filter 11 is restricted to a finite aperture by lens 12, but for mathematical simplicity this can be disregarded for present purposes. The optical transfer function H($f$) of this filter will be periodic because T($x$,$y$) is periodic. One period of H($f$) is shown in FIG. 3 and is defined as follows:

$$H(f) = \begin{cases} 1 - \dfrac{2f}{f_0}(1-\cos\phi_0) & 0<f<f_1 \\ 1 - \dfrac{2f_1}{f_0}(1-\cos\phi_0) & f_1<f<f_0-f_1 \\ 2\cos\phi_0 - 1 + \dfrac{2f}{f_0}(1-\cos\phi_0) & f_0-f_1<f<f_0 \end{cases} \tag{2}$$

where $f$ is the input spatial frequency and $f_o$ is the spatial frequency corresponding to one full period of H($f$). The frequency $f_o$ is determined by the optical system parameters as follows:

$$f_o = \Lambda/\lambda F \tag{3}$$

where $\Lambda$ is the optical filter grating period, $\lambda$ is the wavelength of the incident light, and F is the focal length of lens 12. The spatial frequency $f_1$ is related to $f_o$ as follows:

$$f_1 = f_o \cdot (a/\Lambda). \quad (4)$$

FIG. 3 shows $H(f)$ for general values of $\lambda_o$ and $a/\Lambda$. Since $\phi_o$ can be varied between 0 and $2\pi$, the magnitude $\delta(\lambda)$ of the constant region can thus be controlled. The width of the constant region can be varied from 0 to $0.5 f_o$ by varying $a/\Lambda$ from 0.5 to 0.25, respectively. For example, if $\phi_o = \pi$ ($\cos \phi_o = -1$) and $a/\Lambda = 0.25$, a constant null region extending, along the abscissa, from $0.25\ f_o$ to $0.75\ f_o$ can be obtained. This represents the widest region that can be nulled exactly. However, by properly choosing the values of $\phi_o$ and $a/\Lambda$ *other and different desired null regions of lesser width can also be achieved.*

The optical transfer function defined in equation (2), and illustrated in FIG. 3, is wavelength dependent. The wavelength dependence of equation (2) occurs because $\phi$ has a wavelength dependence, $\phi = (\lambda_o/\lambda)\ \phi_o$ where $\phi$ is the relative phase measured at $\lambda$, while $\phi_o$ is at $\lambda_o$. Further, as indicated in equation (3), for example, $f_o$ is also wavelength dependent. This wavelength dependence does not affect the form of equation (2) or the general configuration of the $H(f)$ curve, but it does alter the frequency limits of the different regions of the $H(f)$ curve.

Figure 4:
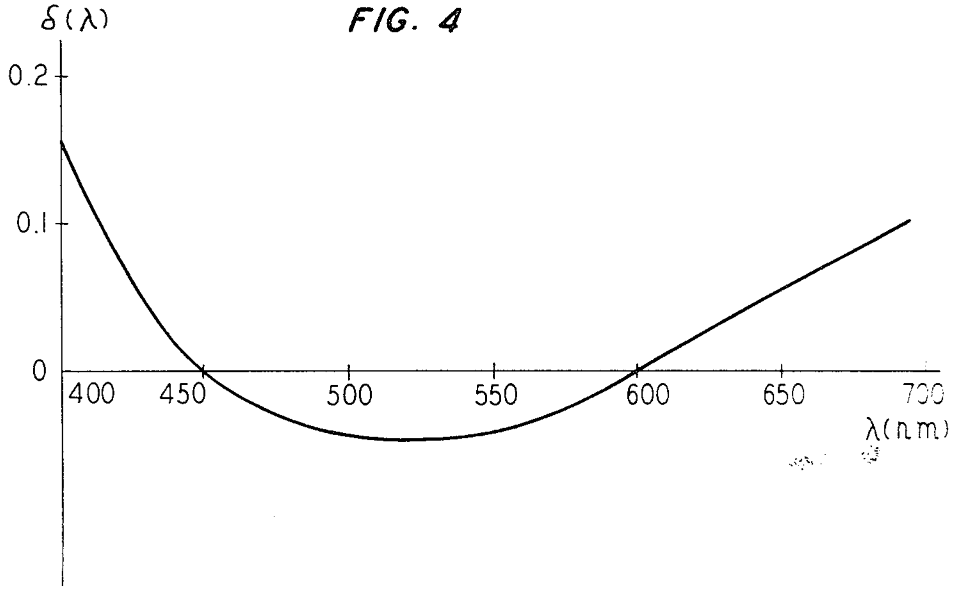

It can be shown from equation (2) that it is possible to choose two wavelengths at which to null $H(f)$. The resulting magnitude $\delta(\lambda)$ of the constant region of the $H(f)$ curve is shown in FIG. 4 for $H(f)$ constrained to be zero at wavelengths of 450 and 600 nanometers (nm). The curve of FIG. 4 is for an asymmetrical rectangular wave phase grating where $a/\Lambda = 0.26$ and $\phi_o = 1.15\pi$. An optical filter having the indicated parameters will result in an optical transfer function that nulls exactly at 450 nm (blue) and at 600 nm (red). Although $H(f)$ differs from zero at wavelengths other than those at which it is chosen to null, the magnitude $\delta(\lambda)$ exceeds 0.10 only at the extremely short wavelength end of the visible spectrum. For wavelengths intermediate 450 and 600 nm (e.g., green), a small ($<0.1$) negative transfer function is realized.

Figure 5:
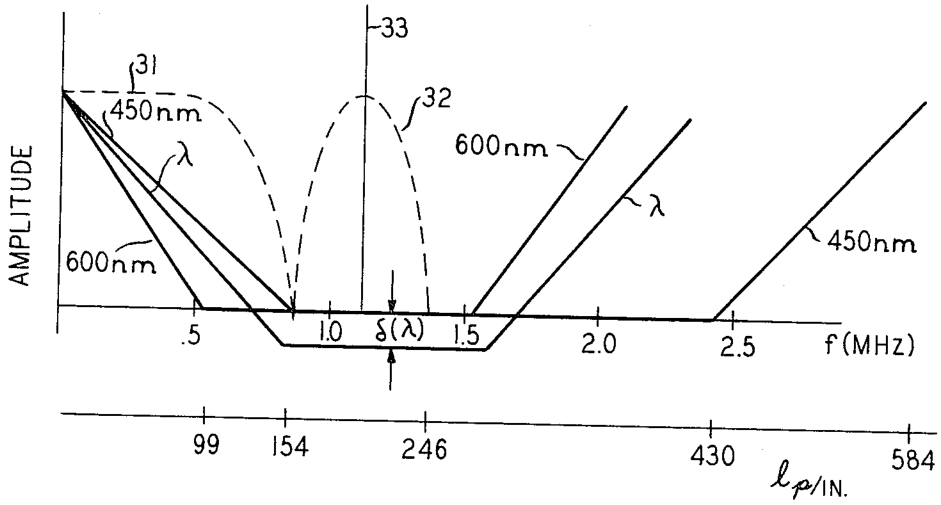
FIGS. 3, 4 and 5 show various curves that are useful in the explanation of the present invention.

FIG. 5 shows, in dotted outline, the frequency bands of the composite video signal, as heretofore described. The illustrated frequency spectrum is achieved at standard PICTUREPHONE scanning rates. The solid lines of FIG. 5 illustrate the composite optical transfer function for an optical filter having an asymmetrical rectangular wave phase grating with $a/\Lambda = 0.26$ and $\phi_o = 1.15\pi$, with a density on the order of 10 line pairs per centimeter (i.e., $\Lambda = 1$ mm). The object lens 12 should thus have a focal length of about 5 centimeters. For both red and blue images, the filter provides an optical transfer function that has a constant null region which extends from at least the lower limit of the modulated band 32 to at least the upper limit of this passband. Accordingly, those spatial frequencies in the object scene which might produce electrical signals in the aforementioned passband are effectively filtered out and the problems of color misinformation and moire patterns are thereby eliminated. For intermediate wavelengths ($\lambda$) such as green, a small ($<0.1$) negative transfer function is realized over said passband, which for present purposes is of no consequence.

The additional abscissa shown in FIG. 5 represents the corresponding spatial frequencies in line pairs per inch at the image plane of the Kell-type gratings.

Since the waveform of the phase distribution is nothing more than a modified square wave and because the parameters of interest are easily controlled, the optical filter 11 can be readily made in accordance with known techniques. For example, a filter of the desired characteristics can be simply and economically produced by a contact printing method using dichromated gelatin as a photosensitive medium in accordance with previously described development and exposure techniques (see "Hologram Formation in Hardened Dichromated Gelatin Films" by L. H. Lin, Applied Optics, May 1969, Vol. 8, No. 5, pages 963–966; and Ultraviolet Hologram Recording in Dichromated Gelatin by H. Kogelnik and T. P. Sosnowski, Applied Optics, Sept. 1970, Vol. 9, No. 9). A number of optical filters have been made in this fashion and the results have been excellent in that color misinformation and moire patterns have been eliminated completely while maintaining good resolution. As will be appreciated by those in the art, however, the filter might also be made by an appropriate, spatially controlled, deposition of a single layer of such materials as are typically used in thin-film optical filters (see Thin-Film Optical Filters by H. A. MacLeod, American Elsevier Publishing Co., Inc. (1969), Appendix I).

The optical filter is shown in FIGS. 1 and 2A as a separate and distinct element 11, comprising a layer of developed dichromated gelatin 21 deposited on a glass substrate 22, positioned in the vicinity of lens 12. In practice, however, the dichromated gelatin is preferably deposited directly on a surface of the lens.

The red, blue and green primary color system is the one most often encountered in the art. However, other color systems have been proposed heretofore — such as cyan, yellow and magenta. It must be evident, therefore, that the present invention is in no way limited to a red, blue and green primary color arrangement and it can quite readily find application in any other color system wherein certain wavelengths must be selectively filtered in the manner and for the purposes described.

For the above reasons, it is to be understood that the foregoing disclosure is merely illustrative of the application of the principles of the present invention and numerous modifications or alterations may be devised by those skilled in the art without departing from the spirit and scope of the invention.

What is claimed is:

1. A single-tube color camera system comprising an image scanning device, striped color filter means disposed in the input light path of said image scanning device and serving to spatially modulate at least two of three selected primary color images, and a lossless optical spatial frequency filter in the form of a phase-only diffraction grating having alternate and parallel stripes of the same transmissivity and a predetermined amount of relative phase retardation between alternate stripes, said optical spatial frequency filter being disposed at a given position between a scene and said color filter means and having a composite optical transfer function with a region of high attenuation that extends at least over the frequency passband produced by the modulation of the input scene by said color filter means.

2. A color camera system as defined in claim 1 wherein the three primary colors are red, green and blue, said optical filter providing for both red and blue light an optical transfer function that has a constant null region which extends over said frequency passband.

3. A color camera system as defined in claim 2 wherein said stripes are orthogonally disposed with respect to the scan lines of the image scanning device.

4. A color camera system as defined in claim 3 wherein said diffraction grating comprises an asymmetrical rectangular wave phase grating having a grating duty cycle ($a/\Lambda$) equal to 0.26 and a relative phase retardation ($\phi_o$) between alternate stripes equal to $1.15\pi$.

5. A color camera system as defined in claim 4 wherein said phase grating is established by a developed layer of dichromated gelatin deposited on an object lens of the system.

* * * * *